United States Patent [19]
McLaughlin et al.

[11] Patent Number: 5,499,040
[45] Date of Patent: Mar. 12, 1996

[54] METHOD AND APPARATUS FOR DISPLAY CALIBRATION AND CONTROL

[75] Inventors: Michael D. McLaughlin, San Jose; John C. Signa, Sunnyvale; Richard K. Greicar, Moss Beach, all of Calif.; John M. Taylor, London, England

[73] Assignee: Radius Inc., Sunnyvale, Calif.

[21] Appl. No.: 266,950

[22] Filed: Jun. 27, 1994

[51] Int. Cl.$^6$ .............................. G09G 5/02; G09G 5/10
[52] U.S. Cl. ...................... 345/146; 345/904; 345/147; 345/150
[58] Field of Search ................................ 345/145, 146, 345/150, 153, 154, 904; 348/177, 178, 180, 189, 191, 734; 358/527, 531

[56] References Cited

U.S. PATENT DOCUMENTS

| | | | |
|---|---|---|---|
| 5,204,665 | 4/1993 | Bollman et al. | 345/145 |
| 5,245,326 | 9/1993 | Zalph | 345/904 |
| 5,263,134 | 11/1993 | Paal et al. | 345/145 |
| 5,298,892 | 3/1994 | Shapiro et al. | 345/904 |
| 5,311,294 | 5/1994 | Cromer et al. | 345/904 |
| 5,334,992 | 8/1994 | Rochart et al. | 345/150 |
| 5,424,754 | 6/1995 | Bar et al. | 345/150 |

FOREIGN PATENT DOCUMENTS

| | | | |
|---|---|---|---|
| 2083669 | 5/1993 | Canada | H04N 1/46 |
| WO93/20660 | 10/1993 | European Pat. Off. | H04N 17/02 |
| WO94/01755 | 1/1994 | European Pat. Off. | G01N 3/46 |

OTHER PUBLICATIONS

Four-page excerpt from "Adobe Photoshop—user Guide", by Adobe Systems Incorporated (1993) pp. 160 and 161.
One-page exerpt from "microProofscreen family" brohcure by miro (Jun. 1993).
Four-page brochure entitled "Pressview 21 System" by SuperMac Technology, Inc. (Oct. 1993).

*Primary Examiner*—Jeffery Brier
*Attorney, Agent, or Firm*—Limbach & Limbach; Alfred A. Equitz

[57] ABSTRACT

A method and system for controlling a display. The system includes a processor programmed to control (and optionally also calibrate) a display in response to user selection of displayed virtual controls. Preferred embodiments of the system includes circuitry within the display device which operates under control of software in response to user-entered commands for adjustment of parameters of the display device. In preferred embodiments, the processor is programmed with software which stores multiple types of data (including display parameters measured during calibration and user-specified adjustment data indicative of differences between first and second sets of display control parameters) in separate data files; executes a locking operation which disables mechanical controls on the display device, periodically and automatically polls the status of the display, and automatically corrects any display parameter whose value differs from a desired value; displays two-dimensional controls with horizontal and vertical segments which a user can drag to vary display parameters such as brightness, contrast, and picture size or position; displays controls enabling a user conveniently to select either a maximum displayed intensity value of one primary color or a linear combination of two primary colors; and achieves excellent color matching between displayed and printed images by setting the display's white point to a proofing level (by directly controlling display circuitry) and prompting the user to perform color matching with the display at the selected proofing white point. The invention also includes the methods performed by the described system.

6 Claims, 11 Drawing Sheets

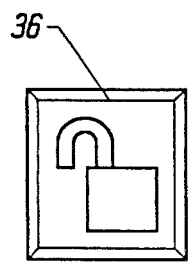
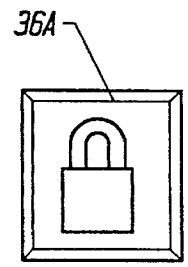
FIG. 4A          FIG. 4B
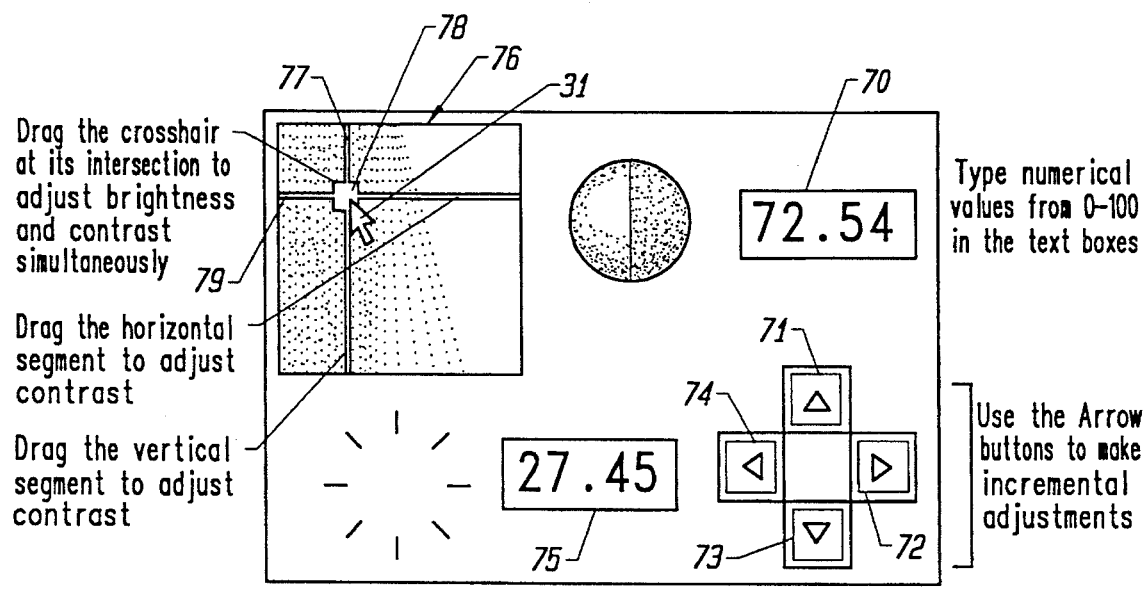
FIG. 5

METHOD AND APPARATUS FOR DISPLAY CALIBRATION AND CONTROL

FIELD OF THE INVENTION

The invention is a computer-implemented method and computer apparatus for controlling and optionally also calibrating a display device. The apparatus of the invention is a computer system programmed to control a display device (typically, a color display device) in response to user selection of displayed virtual controls (e.g., menus and icons), and optionally also to calibrate the display device.

BACKGROUND OF THE INVENTION

Display devices ("displays") for computer systems emit light from grids of tiny rectangles known as pixels. In color displays, each pixel emits light of three colors (typically, red, green, and blue), with the intensity of each color controlled by the computer system.

In cathode ray tube (CRT) color displays, each pixel consists of three phosphor dots: a red phosphor dot, a green phosphor dot, and a blue phosphor dot. Three electron beams are aimed by electromagnets at selected ones of the pixels, with all three beams simultaneously incident at each pixel (each beam incident at a different one of the dots of the pixel). The electromagnets typically cause the beams to scan the pixels sequentially in raster fashion.

Even if a computer system sends identical control signals (specifying the same combination of electron beam intensities) to different displays (or to the same display at different times), many variables will affect the actual color perceived by a viewer as the beams strike a pixel, including but not limited to the following: differences between various brands of graphics cards and CRT display hardware; variations in the circuitry controlling each of the beams of a display; the age of the phosphor dots on which the beams are incident; the ambient lighting conditions around the display; and the strength of the Earth's magnetic field and electromagnetic interference at a given time and place.

Thus, it is desirable from time to time to measure and calibrate at least two characteristics of the pixels (or representative ones of the pixels) of a display: "gamma" and "white point." The "white point" of a pixel is the pixel's perceived color when the computer causes emission of maximum values of red, blue and green light from the pixel. By commanding the computer to change the relative intensities of the maximum emitted levels of red, blue, and green, the display's "white point" can be changed. Examples of standard white points (having well-known definitions) are: 9300K (9300 degrees Kelvin); and D50 (approximately 5000 degrees Kelvin). The relative intensity of the maximum red value (100% red) to that of the maximum green or blue value at a white point of "D50" (the North American industry standard for proofing color photographs) is higher than at a white point of "9300K" (the white point to which many commercially available color monitors are factory-preset).

"Gamma" denotes the relationship between the luminance input sent to a display (from a computer system's graphics card and imaging application software) and the resulting light intensity perceived by a viewer of the display. Many variables affect the consistency of this relationship, including such variables as phosphor age and composition, graphics card and display type, and ambient lighting. Conventionally, computer systems include means for changing a display's gamma setting, to either simulate or compensate for the way other devices display or interpret the relationship between a pixel's lightness and color as it relates to the CRT emitted lightness and color. For example, a low gamma setting may be selected to compensate for the loss of detail that is inherent when displaying shadowed areas of a scanned image on a display device. Or, a high gamma setting may be selected to simulate the way a displayed image would appear if displayed on a television monitor (rather than on a conventional computer display device).

Another important aspect of controlling a display device is to control the size and geometric shape of the displayed images. Some conventional displays and computer systems include means for changing the rectangular dimensions (and edge locations) of a picture area in which images are displayed on a display screen, and for controlling "pincushion" and "barrel" side distortion and trapezoidal side distortion which cause the picture area to have a non-rectangular appearance.

Some conventional displays include mechanical controls (e.g., manually actuatable knobs or buttons) for controlling the size and/or geometric shape of the picture area in which images are displayed. Many conventional displays include mechanical controls for brightness and contrast.

Some conventional computer systems have software which displays "virtual" controls, which simulate mechanical controls, and which can be selected to control characteristics of a display such as brightness, contrast, displayed image size and shape, "gamma," and "white point." To implement such virtual controls, the system is programmed with user interface software which causes a display device to display icons (tools) resembling mechanical controls (e.g., a pair of icons having the appearance of a button labeled "+" for increasing the value of a parameter of the display, and a button labeled "−" for decreasing the parameter's value). The software causes the computer system to vary display parameters in response to user selection of various ones of the icons using a mouse or other input device. For example, each time a user operates a mouse to "click" on an icon representing a "+" button, the software may cause the system to increase incrementally the value of a display parameter corresponding to the "+ button" icon. Examples of such conventional display control user interface software are the "GeoTweak™" product available from RasterOps Corporation, the "CONTROL TOOL" software product available from Miro (for use with "miroPROOF-SCREEN" color monitors available from Miro), the "intellicolor" product available from Radius, Inc., and the "Adobe Photoshop" software product (which includes "Adobe Photoshop Gamma Control Panel" software) available from Adobe Systems Inc.

However, conventional display control hardware and software have been limited by their design simulating mechanical controls, and thus have not enabled users to control a variety of display parameters all in a convenient, intuitive manner.

Also, conventional display control hardware and software have not provided convenient means for enabling an end user to "lock in" a selected set of display parameters (so that the parameters cannot easily be changed inadvertently, or changed by an unauthorized user), and for enabling the end user to "unlock" the parameters to change them when desired. Rather, the manufacturers of conventional systems have recommended that users take the inconvenient step of placing tape over mechanical controls of a display to prevent the settings of such controls from being readily changed.

Computer hardware and software systems have also been developed which enable an end user of a computer system to calibrate parameters of the system's display. For example, the "CALIBRATION TOOL" hardware/software product available from Miro (for use with "miroPROOFSCREEN" color monitors available from Miro) includes a color sensor which can be fastened to a display screen by a suction cup, and software for calibrating the display in response to data measured by the sensor. The CALIBRATION TOOL software allows the end user to save the results of a calibration operation as monitor profile data.

SUMMARY OF THE INVENTION

The invention is a method and system for controlling and optionally also calibrating a display device (typically, a color display device). The system includes a processor programmed to control (and optionally also calibrate) a display in response to user selection of displayed virtual controls. In preferred embodiments, the system includes circuitry within the display device (e.g., electron gun controlling circuitry and electron beam aiming electromagnets) which operates under control of the inventive software in response to user-entered commands for adjustment of parameters (including geometric and color parameters) of the display device.

In preferred embodiments, the system of the invention includes a processor programmed with display control and calibration software which:

stores multiple types of data (including display parameters measured during calibration, user-specified display parameters or display control parameters, and user-specified adjustment data indicative of differences between first and second sets of display control parameters) in separate data files so that the user can retrieve and edit selected ones of the data files;

executes a locking operation in which it disables mechanical front panel controls on the display device, periodically and automatically polls the status of the display, and automatically corrects any display parameter whose value differs from a desired value (preferably also the locking software implements password protection to prevent unauthorized users from using the inventive display control software when the mechanical front panel controls are disabled);

displays two-dimensional virtual controls with horizontal and vertical segments (and preferably also a crosshair control at the intersection of horizontal and vertical segments) which a user can drag Coy manipulating a mouse or other input device) to command the system to vary display parameters such as brightness, contrast, picture size, and picture position (preferably, the two-dimensional controls are shaped and/or colored to mnemonically indicate which control operation is implemented by dragging one or both segments in a particular direction);

displays virtual controls enabling a user conveniently to select a maximum displayed intensity value of one primary color (e.g., red, green, or blue) or simultaneously to select a maximum displayed intensity value of a linear combination of two primary colors (e.g., of cyan, magenta, or yellow, each of which is a linear combination of two red, green, and blue values); and achieves excellent matching between displayed and printed images at a proofing white point by directly setting a display's white point to a "proofing" level (e.g. 5000 degrees Kelvin) by directly controlling display circuitry in response to user selection of such proofing white point, and prompting the user to execute a color matching operation with the display at the selected proofing white point or other definitions of white as perceived by the user.

The invention also includes methods performed by the described hardware and software of the inventive system. The virtual controls displayed by the invention preferably have "mnemonic" appearance, so that the inventive user interface is "universal" and language independent.

BRIEF DESCRIPTION OF THE DRAWINGS

FIGS. 4A is an enlarged view of icon 36 (of FIG. 2) in a first state of that icon.

FIG. 4B is an enlarged view of icon 36 (of FIG. 2) in a second state of that icon.

FIG. 5 is window generated by a preferred embodiment of the inventive apparatus, with brightness and contrast control tools displayed therein.

DETAILED DESCRIPTION OF THE PREFERRED EMBODIMENT

Figure 1:
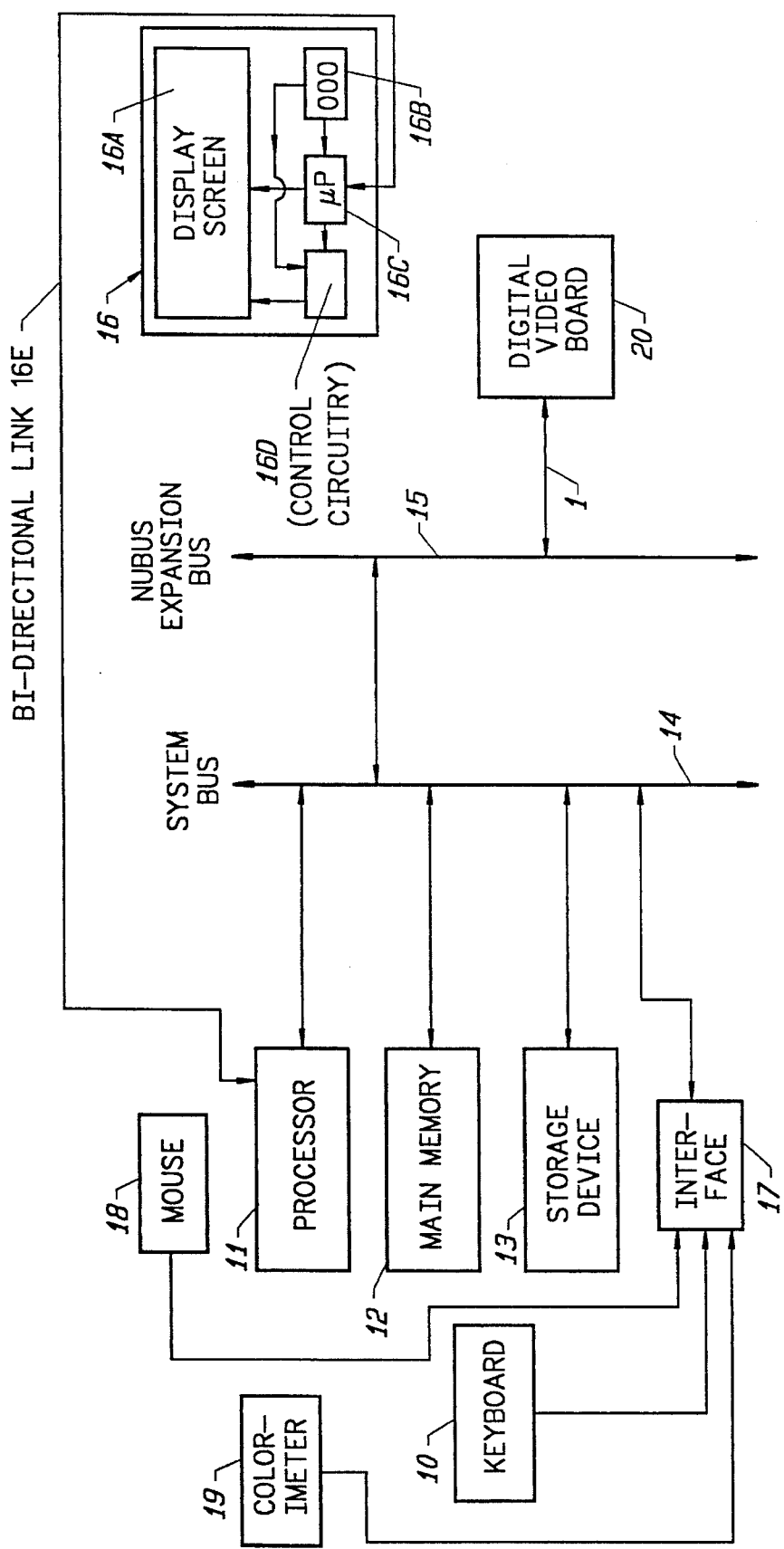
FIG. 1 is a preferred embodiment of the inventive apparatus.

With reference to FIG. 1, a preferred embodiment of the invention includes programmed processor 11, main memory 12 (a random access memory), data storage device 13, and interface 17, all connected along a system bus 14, and mouse (or other input device) 18 and computer keyboard 10 connected to interface 17.

Expansion bus 15 is connected to system bus 14, and digital video board 20 and computer display device 16 (having display screen 16A) are connected along expansion bus 15. Processor 11 rims the operating system and applications software that controls the operation of digital video board 20 (and the other system components). Preferably, this software includes the operating system software known as Macintosh System 7.0 software (or a later version thereof). In typical embodiments of the invention, display 16 is an intelligent color monitor including a programmed processor 16C, and processor 11 is programmed with color management system software, which can be commercially available EftColor software (available from Electronics for Imaging, Inc.), PRECISION Color Management System software (available from KEPS), Kodak Color Management System software (available from Eastman Kodak), FotoFlow software (available from Agfa-Gevaert N.V.), or ColorSync software (available from Apple Computer, Inc.). Display 16 preferably includes programmed processor 16C, manual controls 16B (e.g., manually operated buttons and switches), control circuitry 16D, and display screen 16A (typically a three-gun CRT display screen for displaying color images). Circuitry 16D adjusts the electron guns (and electron beam aiming electromagnets) within display screen 16A to control the characteristics (including geometric and color parameters) of the image displayed on screen 16A, in response to signals from manual controls 16B or from processor 16C (which relays control signals communicated to it from processor 11 via bi-directional communication link 16E). The latter signals (from processor 16C) are typically generated in response to user commands entered using keyboard 10 or mouse 18 in response to virtual controls displayed in accordance with the invention. The processor 16C also communicates status and configuration information to software running on processor 11 via bi-directional communication link 16E.

Colorimeter device 19 is connected to interface 17. The SuperMatch Display Calibrator Pro product (available from SuperMac Technology, Inc.) includes a tri-stimulus colorimeter device suitable (in many embodiments of the invention) for use as colorimeter 19. When this type of colorimeter is positioned against screen 16A of display 16, it selectively senses the intensity of red, green, and/or blue light emitted from selected pixels (or groups of pixels) of screen 16A (when display 16 is a color display device), and converts the measured signals into digital data suitable for transfer through interface 17 and processing by processor 11. Preferably, processor 11 (and/or processor 16A) is programmed with software for calibrating display 16 in response to measured data from colorimeter 19 (and optionally also other data such as user-selected parameters entered using keyboard 10 or mouse 18).

In a class of preferred embodiments, interface 17 is an ADB (Apple Desktop Bus) port of a Macintosh computer, and expansion bus 15 is connected to a second ADB port of the Macintosh computer. This connection may also be implemented by other standard communication means, such as RS232 or RS422 serial links, or other means.

Appropriately programmed processor 11 performs all necessary digital processing operations (described below) on video (or other image data) received from memory 12 or 13 (and optionally also on data from colorimeter 19), controls the writing of image data to digital video board 20, and generates control signals for digital video board 20 (and processor 16C and/or circuitry 16D of display device 16). Board 20 drives display device 16, to cause image and/or text data to be displayed in windows on screen 16A (where the data has been transferred to bus 15 from system bus 14 under control of processor 11). Preferably, board 20 is capable of processing 24-bit color video data for display on device 16, and processor 11 has 32-bit addressing capability.

Main memory 12 stores the program and data sets for processor 11, and preferably has at least an eight megabyte capacity. Processor 11 and main memory 12 are preferably implemented as any computer having at least eight megabytes of random-access memory.

Storage device 13 is typically a hard disk (preferably having at least 80 megabyte capacity), but can alternatively a magneto-optical disk or other read/write device, or (in some embodiments) a read-only device such as a CD ROM.

Processor 11 and storage device 13 communicate with each other (and with main memory 12) over system bus 14. Bus 14 also allows data communication to expansion bus 15.

Processor 11 (and/or processor 16C) is programmed with software (including user interface software to be described below) for implementing the inventive method. The user interface software is capable of accessing software for controlling digital video board 20 and display 16 (and other system and application software) in response to commands entered by the user using mouse 18 or keyboard 10, and is capable of instructing board 20 (and/or processor 16C) to generate displays of the type shown in FIGS. 29 and 11 on screen 16A of device 16.

Digital video (or still image) data are stored in storage device 13. Processor 11 preferably can cache selected portions of this data, including frames of data selected for display on display device 16, by copying the data into random access memory 12.

Figure 2:
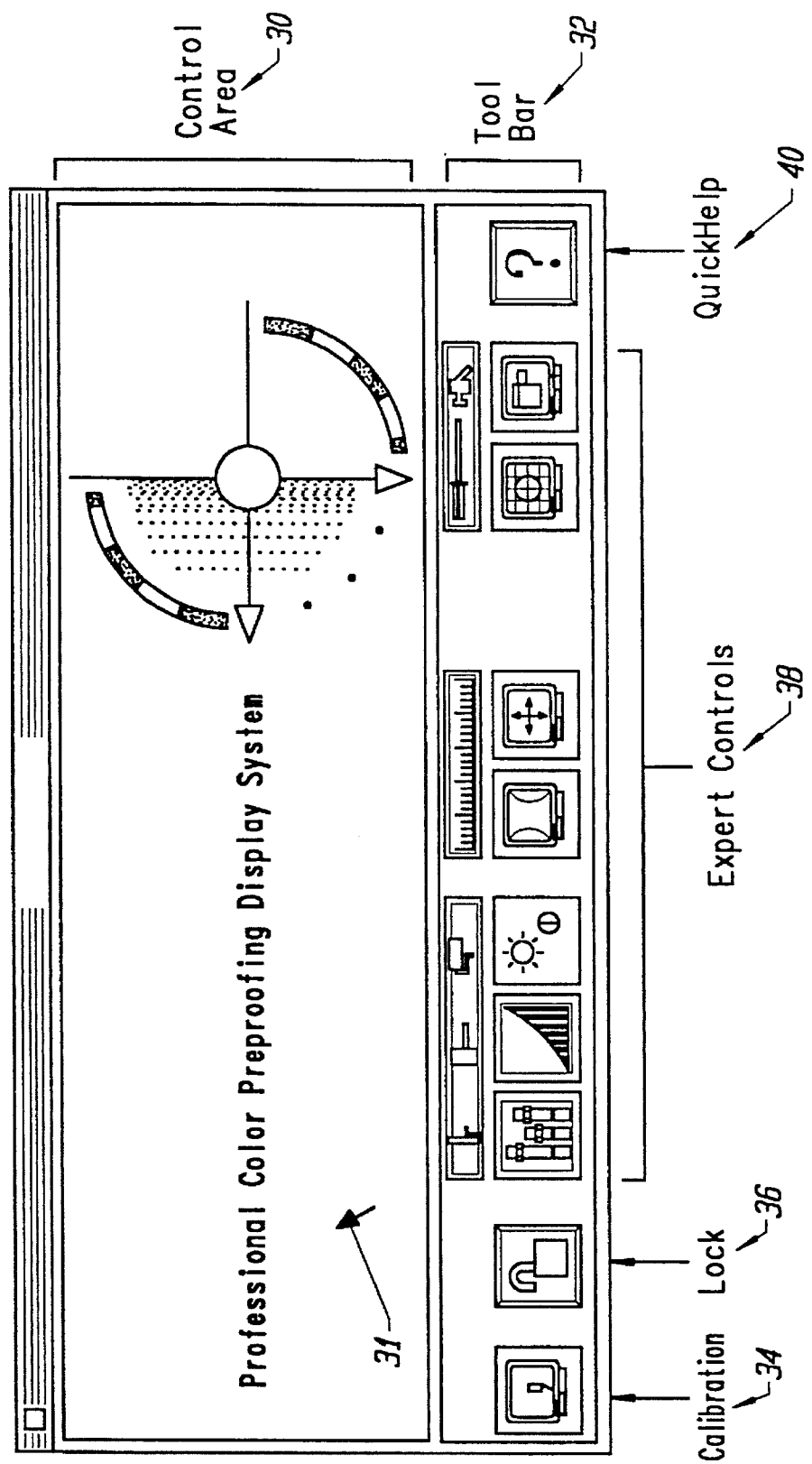
FIG. 2 is a window of a type generated by a preferred embodiment of the inventive apparatus, with display control and calibration icons displayed in a "tool bar" area thereof.

When processor 11 has been programmed with a preferred embodiment of the inventive display control and calibration software, a command for execution of the software results in generation of an initial display of the type shown in FIG. 2 in a window (sometimes referred to as the "main window") on screen 16A of display 16. The main window comprises area 32 (sometimes referred to as tool bar area 32) and control area 30. In typical embodiments of the inventive software, each time the software is used for the first time with a new display 16, the software automatically prompts the user to perform software configuration by manipulating mouse 18 or keyboard 10 to specify the type of display 16 (i.e., the hardware employed to implement display device 16). Typically, the configuration operation is performed by manipulating mouse 18 or keyboard 10 in response to dialog boxes, menus, and/or other prompts displayed on in control area 30 of the main window on display 16. The purpose of configuration is to set parameters (e.g., the manufacturer and model of the display device, an identification of the port to which the display is connected, etc.) to be used in display control and calibration routines to be performed later.

With reference to FIG. 2, a user can enter a command for display control or calibration (normally after the software has been configured) by selecting one of icons 34, 36, 38, or 40 (sometimes referred to as "controls" or "tools") displayed in area 32 of the main window. Area 32 (sometimes referred to as "tool bar" 32) displays calibration icon 34, lock icon 36, expert controls 38, and help icon 40. The user selects any desired one of the icons by manipulating mouse 18 to position a displayed cursor (e.g., cursor 31) over the icon and then "clicking" (or double-clicking) on the icon by manipulating buttons on the mouse.

In response to selection of calibration icon 34, programmed processor 11 executes a calibration operation (to be described with reference to FIG. 10) in which it receives and processes measured data from calibration device (colorimeter) 19.

In response to selection of lock icon 36, programmed processor 11 executes locking/unlocking software to be described with reference to FIGS. 4, 4A, and 4B.

Expert controls 38 include the following icons (better shown in FIG. 3): color match control 40, white point control 41, gamma control 42, brightness/contrast control 43, picture size/shape control 44, pincushion/barrel antidistortion control 45, position/size control 46, configuration control 48, test pattern control 49, and display configuration control 50. Additional expert controls in preferred embodiments of the invention include trapezoidal antidistortion controls, static convergence (horizontal or vertical) controls, vertical linearity controls, raster rotation controls (for clockwise-counterclockwise adjustments), and a degauss control.

Figure 11:
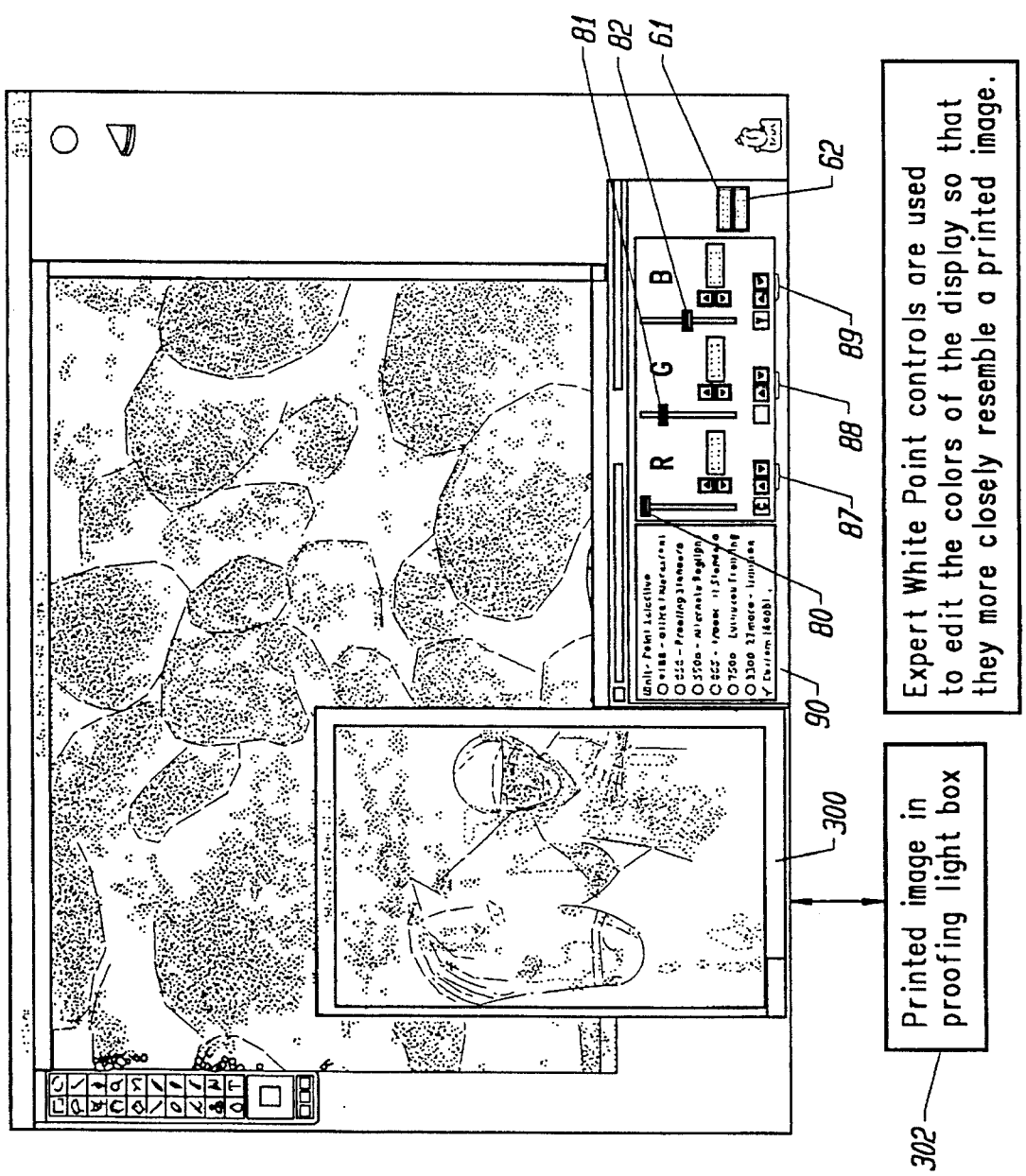
FIG. 11 is a display generated by a preferred embodiment of the white point control software of the invention.

In response to selection of color match control 40, programmed processor 11 activates white point control 41, gamma control 42, and brightness/contrast control 43 (to be described with reference to FIGS. 5, 6, and 11).

In response to selection of picture size/shape control 44, programmed processor 11 activates pincushion/barrel antidistortion control 45 and position/size control 46 (to be described with reference to FIGS. 7–9).

In response to selection of configuration control 48, programmed processor 11 activates display configuration control 50 (to be described with reference to FIG. 4) and test pattern control 49. If the user then selects control 49, programmed processor 11 will display a menu of test patterns, and the user can then select any of the patterns for display on display device 16.

In response to selection of help icon 40, programmed processor 11 displays one or more menus prompting the user to select subject categories. In response to user selection of one or more of the subject categories, the system displays text explaining corresponding features of the inventive software.

An important aspect of the invention is a method and means for enabling an end user of the FIG. 1 system to "lock in" a selected set of display parameters (so that the parameters cannot easily be changed inadvertently or by an unauthorized user), and enabling the end user to "unlock" the parameters to change them when desired.

In a preferred embodiment to be described with reference to FIG. 4, the locking (or unlocking) operation is performed as follows. First, the user selects configuration control 48 (by superimposing cursor 31 on control 48 using mouse 18, and clicking on control 48 by pressing one or more buttons on the mouse) to activate controls 49 and 50. Then, the user selects display configuration control 50 Coy superimposing cursor 31 on control 50 using mouse 18 and clicking on control 50) which causes programmed processor 11 to display configuration controls 60, 61, 62, and 63 in area 30 as shown in FIG. 4.

Then, the user selects control 60 ("clicks on" control 60) to activate or deactivate the locking software (successive clicks alternately activate and deactivate the software). In response to a user command for deactivation of the locking software, programmed processor 11 may enable mechanical controls on display 16 (e.g., controls 16B on the front panel of display 16 as shown in FIG. 1), and deactivates virtual controls 38. In response to a user command for activation of the locking software, programmed processor 11 disables the front panel controls on display 16, and restores the display parameters to their state as of the last time the user deactivated the locking software. In the "locked" mode (the mode in which the mechanical front panel controls are disabled), the display parameters can be controlled only by selecting desired ones of virtual controls 38. Also during the locked mode, the user can select desired ones of virtual controls 60–62 and 36 to perform locking/unlocking operations.

Figure 4:
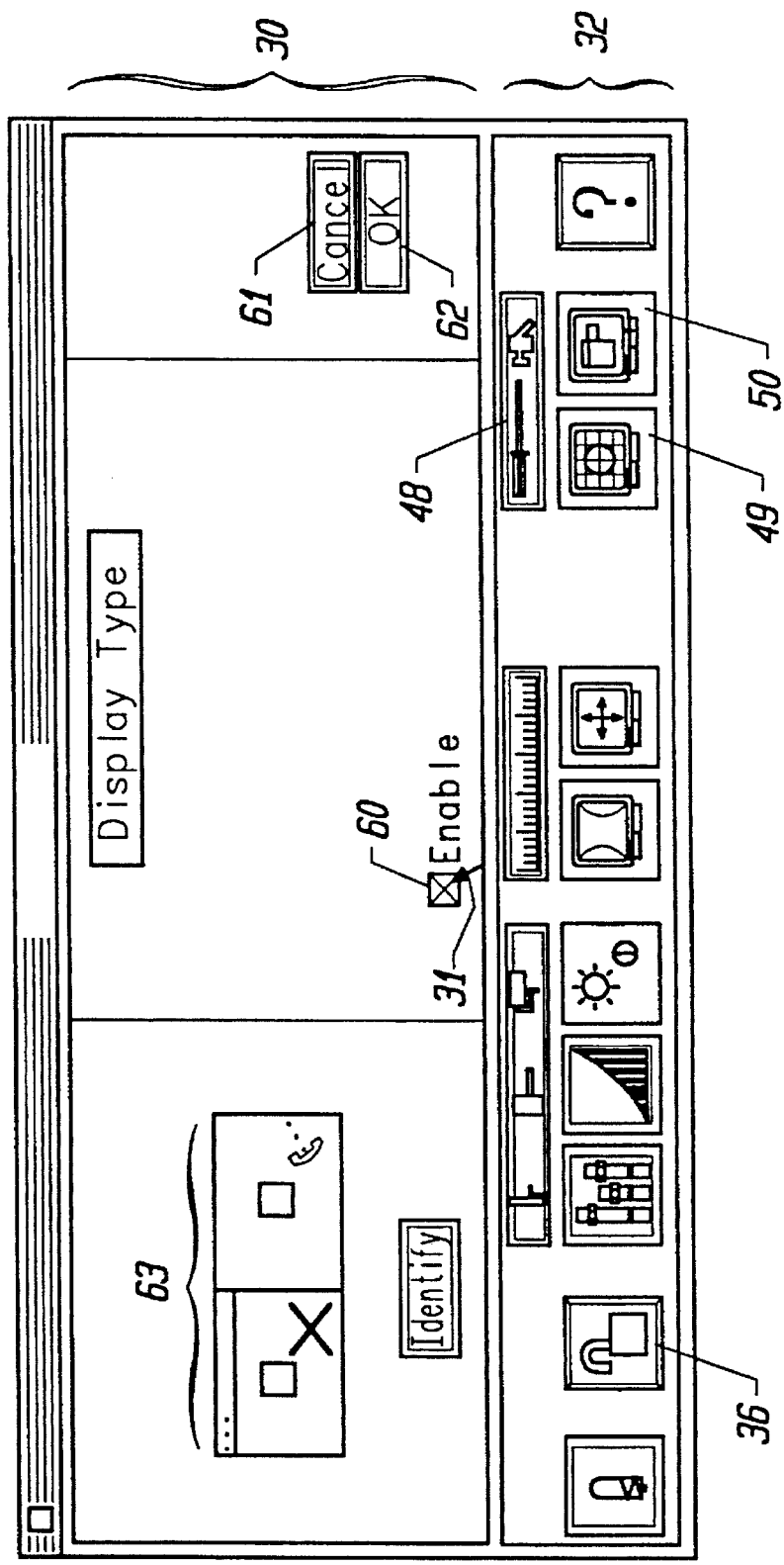
FIG. 4 is a window of a type generated by a preferred embodiment of the inventive apparatus, with display configuration tools displayed in a "control area" thereof.

Specifically, with reference to FIG. 4, the user activates the inventive locking software (enters the "locked" mode) by positioning cursor 31 on "enable lock" control 60 and "clicking" on control 60, and then moving cursor 31 to "OK" control 62 and "clicking" on control 62 (clicking on "cancel" icon 61 cancels selection of control 60). In response to this sequence of steps (culminating in selection of control 62), programmed processor 11 executes locking software which performs the following operations:

initially disables the mechanical from panel controls on the housing of display device 16;

periodically (and automatically) actively polls the status of the display (including the current status of the mechanical front panel controls), and optionally also polls the status of the display response to user entry of a specific command;

automatically corrects any display parameter whose value differs from the desired value thereof (i.e., whose value differs from the value most recently determined by the inventive display control or calibration software). This automatic correction automatically maintains desired display settings at all times while the mechanical front panel controls are disabled, using the results of the polling operations as feedback correction data; and automatically disables the mechanical front panel controls if the polling software finds that they have inadvertently become active (either by a power on/off transition or by some other manner). This ensures the color will remain constant and secured.

Preferably, the inventive locking software also implements password protection, to prevent unauthorized users from using the inventive display control software during the "locked" mode. Password protection is implemented as follows in a preferred embodiment.

After entering the locked mode, the user positions cursor 31 over "lock" icon 36 (at this time, icon 36 has the "opened" appearance shown in FIGS. 4 and 4A) and clicks on icon 36. In response, processor 11 displays a dialog box which prompts the user to enter a password (using keyboard 10). After the user enters a password (and clicks on the "OK" icon 62), processor 11 executes the following operations: it causes display of a modified lock icon 36A (which preferably has a "closed" appearance as shown in FIG. 4B); and it disables all of icons 34, 38, 60, and 62 (and dims these icons to indicate that they have been disabled). An authorized user can then enable icons 34, 38, 60, and 62 by "clicking" on lock icon 36A Coy manipulating the mouse) and entering the password.

We next describe operation of expert controls 38 in more detail.

When controls 38 are active, selection of color match control 40 causes programmed processor 11 to activate white point control 41, gamma control 42, and brightness/contrast control 43.

To adjust brightness and contrast, the user then selects (clicks on) control 43. In response, the system displays controls 70–79 (shown in FIG. 5) in a window in display area 30. The user can then control brightness and/or contrast by selecting desired ones of controls 70–79.

The user can enter a desired contrast level (in a range from 0 to 100, for example) by selecting box 70 (using mouse 18) and then typing a desired numerical value in box 70 (using keyboard 10). Similarly, the user can enter a desired brightness level (in a range from 0 to 100, for example) by selecting box 75 (using mouse 18) and then typing a desired numerical value in box 75 (using keyboard 10).

Alternatively, the user can select two-dimensional control 76 (using mouse 18). By positioning cursor 31 along vertical segment 77 within control 76, and then clicking on segment 77 and dragging segment 77 to the right (or left) by translating mouse 18 to the right (or left), the user can increase (or decrease) the brightness level. Preferably, programmed processor 11 increases the brightness level in response to dragging of segment 77 to the right, and decreases the brightness level in response to dragging of segment 77 to the left. As shown in FIG. 5, control 76 is preferably shaded from dark to light, with increasing darkness toward its left edge, to mnemonically indicate that translation of segment 77 to the right results in increasing brightness.

By positioning cursor 31 along horizontal segment 79 within control 76, and then clicking on segment 79 and dragging segment 79 toward the top (or bottom) of control 76 Coy translating mouse 18 in a corresponding direction), the user can increase (or decrease) the contrast level. Preferably, programmed processor 11 increases the contrast level in response to dragging of segment 79 upward (toward the top of control 76), and it decreases the contrast level in response to dragging of segment 79 downward (toward the bottom of control 76).

The user can simultaneously vary both the brightness and contrast levels by positioning cursor 31 on "crosshair" tool 78 (at the intersection of segments 77 and 79), and then clicking on tool 78 and dragging tool 78 to any desired position within the area of control 76 Coy translating mouse 18 correspondingly). For example, in a preferred embodiment, programmed processor 11 both decreases brightness level and increases contrast level in response to dragging of tool 78 toward the upper left corner of control 76.

Preferably, processor 11 is programmed to display the current brightness level (e.g., the value most recently selected using control 76) in box 75 (in addition to controlling display 16 to display images with such brightness), and to display the current contrast level in box 70 (in addition to controlling display 16 to exhibit such contrast).

Typically, tools 77–79 select approximate values of contrast and brightness. To refine such approximate selections, the user can employ "arrow button" tools 71–74 as follows. To increase (decrease) contrast level, the user selects tool 71 (tool 73) by positioning cursor 31 thereon, and then presses a button on mouse 18 to make incremental contrast increases (decreases). To increase (decrease) brightness level, the user selects tool 72 (tool 74) by positioning cursor 31 thereon, and then presses a button on mouse 18 to make incremental brightness increases (decreases).

In response to selection of tool 40 and then gamma control 42, followed by entry of a desired gamma value using keyboard 10 and/or mouse 18, programmed processor 11 commands display 16 to display images with the specified gamma value.

In response to selection of tool 40 and white point control 41, programmed processor 11 executes software enabling the user to select a desired white point parameter. In response to selection of white point control 41, a preferred embodiment of the invention displays controls 80–90 (shown in FIG. 6) in a window in display area 30. The user can then control the white point parameter by selecting desired ones of controls 80–90.

The user can select any of several standard (predetermined) white point values by manipulating mouse 18 to position cursor 31 on a corresponding one of "radio button" controls 90 and "clicking" on the selected one of radio button controls 90. For example, the user can select "D50" (the North American industry standard white point parameter for proofing color photographs) by clicking on the second radio button 90 from the top (this radio button 90 is highlighted in FIG. 6 to indicate that it has been selected).

Alternatively, the user can select a desired maximum value of red, green, or blue by manipulating mouse 18 to drag displayed "slider" control 80, 81, or 82, respectively. For each position of control 80, a corresponding maximum intensity value is displayed numerically in box 84A, for each position of control 81, a corresponding maximum intensity value is displayed numerically in box 85A, and for each position of control 82, a corresponding maximum intensity value is displayed numerically in box 86A. For example, to lower the maximum red value, the user positions the cursor on control 80 and then "clicks" on control 80 and drags control 80 downward (causing the numerical maximum red value displayed in box 84A to decrease correspondingly and causing processor 11 to change the maximum red setting of display device 16) until the desired value is reached.

To incrementally increase the maximum value of red, green, or blue, the user can click on the upper "button" control of the corresponding red "arrow button" pair 84, green "arrow button" pair 85, or blue "arrow button" pair 86. Similarly, to incrementally decrease the maximum value of red, green, or blue, the user can click on the lower "button" control of the corresponding red "arrow button" pair 84, green "arrow button" pair 85, or blue "arrow button" pair 86. Each time the user clicks on one of buttons 84, 85, or 86, the numerical value displayed in corresponding box 84A, 85A, or 86A, also changes (and processor 11 changes the setting of display 16 accordingly).

Alternatively, the user can enter a desired maximum red level (in a range from 0 to 100, for example) by selecting box 84A (using mouse 18) and then typing a desired numerical value in box 84A (using keyboard 10). Similarly, the user can enter a desired maximum green (or blue) level by selecting box 85A (or 86A) and then typing a desired numerical value in box 85A (or 86A).

The user can simultaneously adjust maximum values of two of red, green, and blue using cyan (C) control 87, magenta (M) control 88, or yellow (Y) control 89. For example, to decrease (or increase) maximum values of green and blue simultaneously, the user "clicks" on the "down" (or "up") arrow button of cyan control 87. In response, processor 11 changes both the maximum green and blue settings of display 16 according to a programmed ratio (e.g., the ratio can be one, in which case the maximum green and blue settings are changed equally).

Provision of controls 80–82 as well as controls 87–89 makes the user interface software of the invention more appealing and relevant to printers and press operators/technicians, by graphically showing the relationship between RGB (or CMY) adjustments and white point settings.

Figure 6:
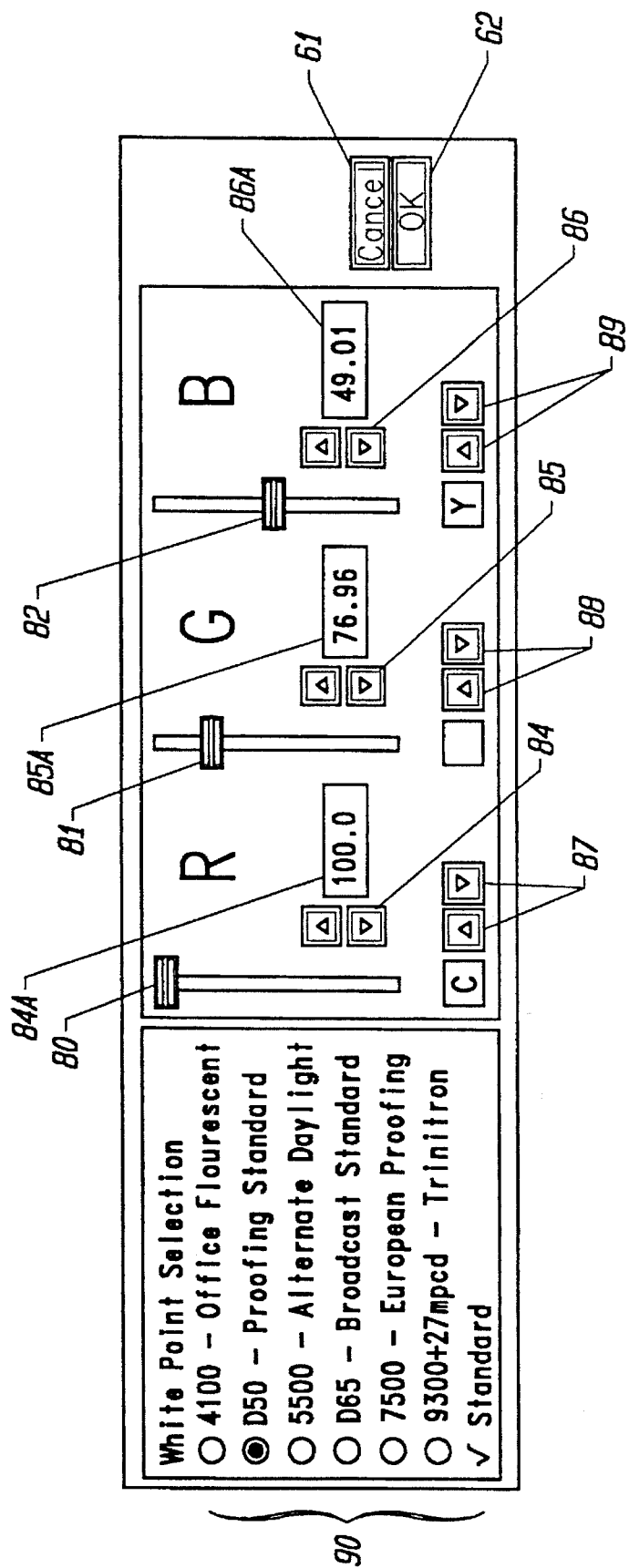
FIG. 6 is window generated by a preferred embodiment of the inventive apparatus, with white point control tools displayed therein.

The virtual controls shown in FIG. 6 allow a user to alter one primary color (R, G, or B) using control 80, 81, or 82, or two primary colors (RG, GB, or RB) simultaneously using one of controls 87, 88, and 89.

Controls 87–89 allow the user to select and adjust cyan, magenta, or yellow values (i.e., ink color values). In response to operation of controls 87–89, the system automatically manipulates additive primary colors on display 16 in real time based on the user's selection. For example, a user command to add cyan to the displayed image will cause the system to automatically (and simultaneously) add green and blue, and a user command to subtract cyan from the displayed image will cause the system to automatically (and simultaneously) subtract green and blue. Preferably, processor 11 is programmed so that if the user adds cyan when either green or blue values are already at their maximum, processor 11 will automatically reduce red intensity, resulting in a more dominating green/blue color make-up, and thus implementing the user-specified cyan adjustment.

After the user has entered a desired white point using controls 90 (or equivalently, after the user has entered maximum values of red, green, and blue using controls 80–89), the system saves the entered values when the user clicks on "OK" control 62. The user can click on "cancel" control 61 to return the values to their previously saved values.

In response to selection of picture size/shape control 44, followed by selection of size/position control 46, programmed processor 11 executes software enabling the user to control the size and/or position of the pixel array displayed by display device 16. Specifically, in response to selection of control 46 in this context, a preferred embodiment of the invention displays controls 91–104 (shown in FIG. 7) in a window in display area 30, and controls 111–124 (shown in FIG. 8) in another window in display area 30. The user can then control picture size and/or position selecting desired ones of controls 91–104 and 111–124.

Figure 7:
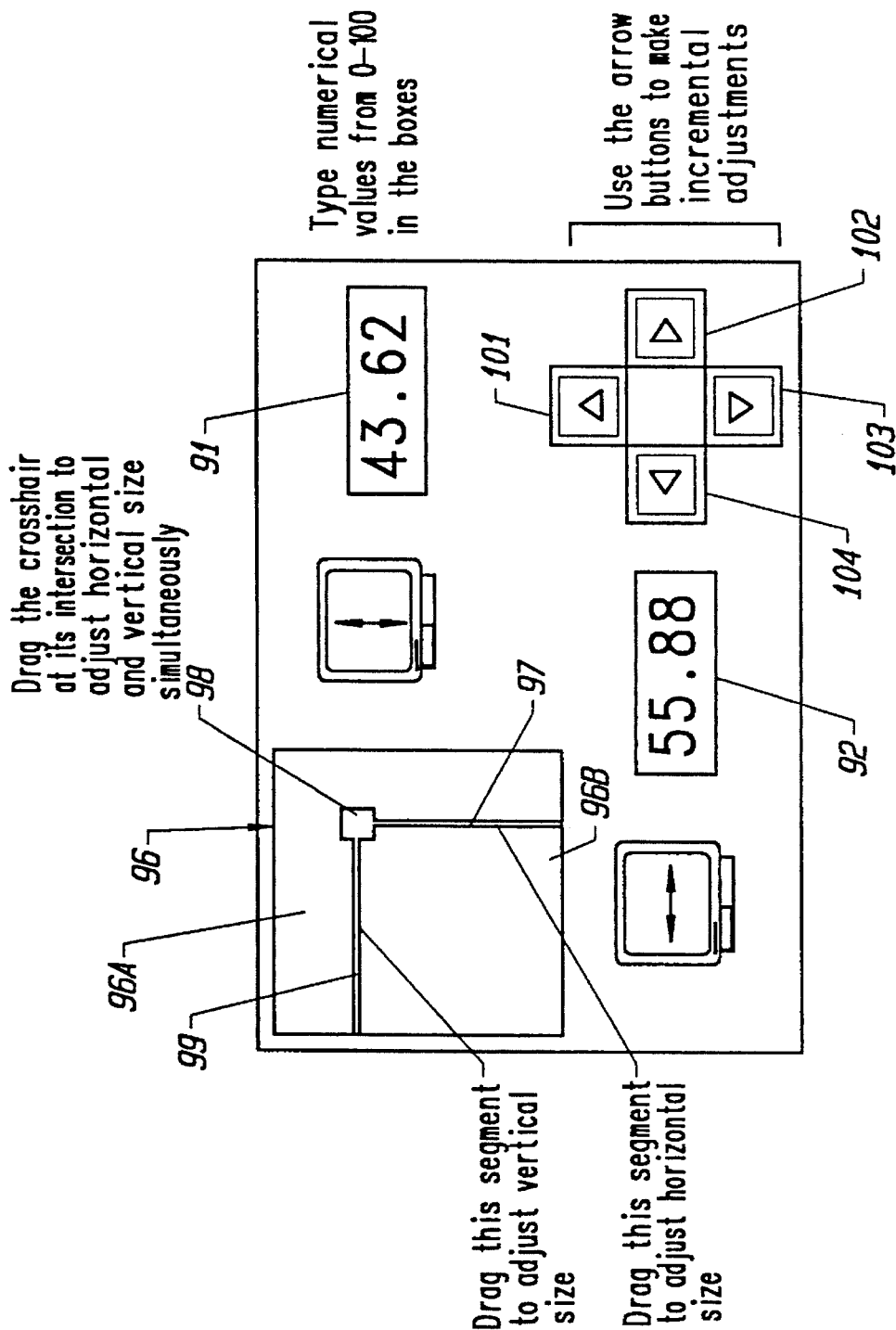
FIG. 7 is window generated by a preferred embodiment of the inventive apparatus, with picture size control tools displayed therein.

With reference to FIG. 7, the user can enter a vertical picture size value (in a range from 0 to 100, for example) by selecting box 91 (using mouse 18) and then typing a desired numerical value in box 91 (using keyboard 10). Similarly, the user can enter a horizontal picture size value by selecting box 92 (using mouse 18) and then typing a desired numerical value in box 92 (using keyboard 10).

Alternatively, the user can select two-dimensional size control 96 (using mouse 18). By positioning cursor 31 along vertical segment 97 within control 96, and then clicking on segment 97 and dragging segment 97 to the right (or left) by translating mouse 18 to the right (or left), the user can increase (or decrease) the horizontal dimension of the picture (the horizontal size of the displayed pixel array). By positioning cursor 31 along horizontal segment 99 within control 96, and then clicking on and dragging segment 99 toward the top (or bottom) of control 96 Coy translating mouse 18 in a corresponding direction), the user can increase (or decrease) the vertical dimension of the picture.

As shown in FIG. 7, control 96 preferably has two differently colored regions (colored region 96A to the right of segment 97 and above segment 99, and differently colored region 96B to the left of segment 97 and below segment 99), to mnemonically indicate that translation of segment 97 and/or 99 changes the picture size. For example, translation of segment 97 to the right (or translation of segment 99 upward) results both in an increase of the size of region 96B and in an increase in the picture size displayed by display device 16.

The user can simultaneously vary both the vertical and horizontal picture dimensions by positioning cursor 31 on "crosshair" tool 98 (at the intersection of segments 97 and 99), and then clicking on tool 98 and dragging tool 98 to any desired position within the area of control 96 (by translating mouse 18 correspondingly). For example, in a preferred embodiment, programmed processor 11 increases both dimensions in response to dragging of tool 98 toward the upper right corner of control 96.

Preferably, processor 11 is programmed to display the current picture dimensions (e.g., the values most recently selected using control 96) in boxes 91 and 92, as well as to control display 16 to display images with such dimensions. Typically, tools 97–99 will be employed to select approximate picture dimensions, and the user will employ "arrow button" tools 101–104 in the following manner, to refine these approximate selections. To increase (decrease)vertical size, the user selects tool 101 (tool 103) by positioning cursor 31 thereon, and then presses a button on mouse 18 to make incremental vertical size increases (decreases). To increase (decrease) horizontal size, the user selects tool 102 (tool 104) by positioning cursor 31 thereon, and then presses a button on mouse 18 to make incremental horizontal size increases (decreases).

Figure 8:
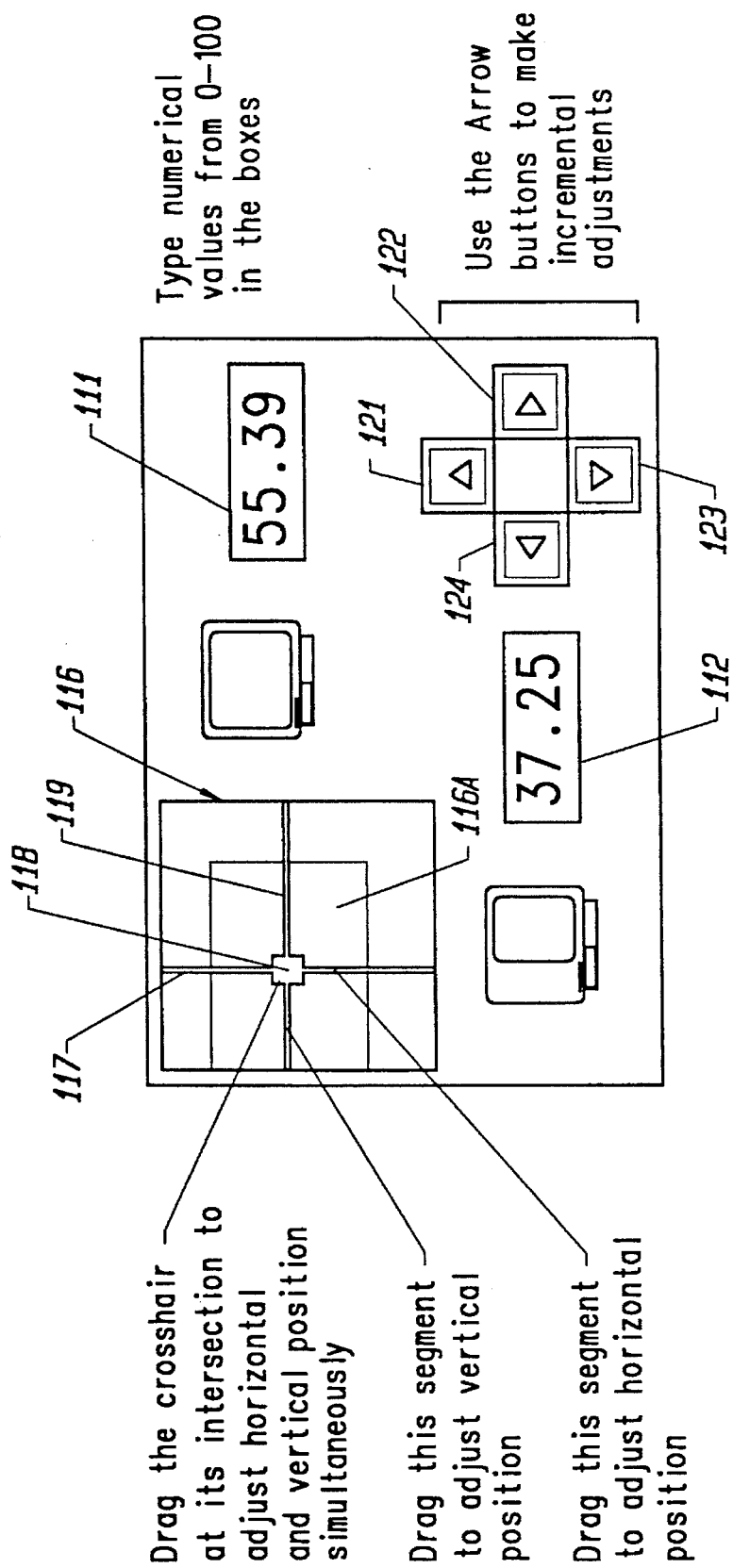
FIG. 8 is window generated by a preferred embodiment of the inventive apparatus, with picture position control tools displayed therein.
Figure 9:
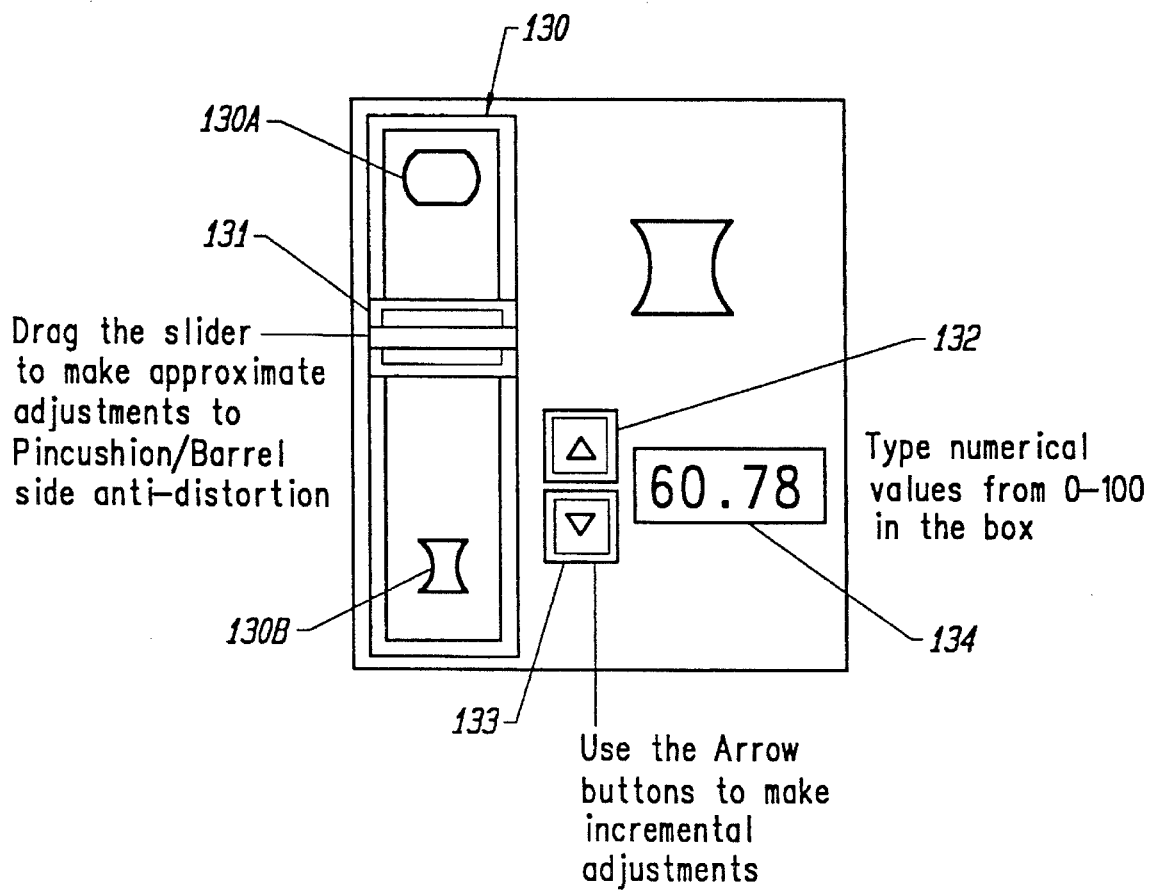
FIG. 9 is window generated by a preferred embodiment of the inventive apparatus, with picture shape control tools displayed therein.

With reference to FIG. 8, "vertical picture position" and "horizontal picture position" denote the coordinates (on the screen of display device 16) of a defined feature (such as the center point, upper left corner, or the like) of the pixel array displayed by device 16. The user can enter a vertical picture position value (in a range from 0 to 100, for example)by selecting box 111 (using mouse 18) and then typing a desired numerical value in box 111 (using keyboard 10). The user can enter a horizontal picture position value by selecting box 112 (using mouse 18) and then typing a desired numerical value in box 112 (using keyboard 10).

Alternatively, the user can select two-dimensional position control 116 (using mouse 18). By positioning cursor 31 along vertical segment 117 of control 116, and then clicking on segment 117 and dragging segment 117 to the right (or left) by translating mouse 18 to the right (or left), the user commands the system to shift the horizontal picture position to the right (or left). By positioning cursor 31 along horizontal segment 119 of control 116, and then clicking on and dragging segment 119 toward the top (or bottom) of control 116 Coy translating mouse 18 in a corresponding direction), the user commands the system to shift the vertical picture position upward (or downward).

As shown in FIG. 8, control 96 preferably has two differently colored regions (a first region 116A always centered at crosshair tool 118, and a second region surrounding region 116A) to mnemonically indicate that translation of segment 117 and/or 119 results in shifting of picture position (e.g., shifting of segment to the right results in shifting of region 116A to the right, as well as in shifting to the right of the picture position displayed on display device 16)

The user can simultaneously vary both the vertical and horizontal picture position by positioning cursor 31 on crosshair tool 118 (at the intersection of segments 117 and 119), and then clicking on tool 118 and dragging tool 118 to any desired position within the area of control 116 Coy translating mouse 18 correspondingly). For example, in a preferred embodiment, programmed processor 11 moves the picture position toward the upper right corner of the screen of device 16 in response to dragging of tool 118 toward the upper right corner of control 116.

Preferably, processor 11 is programmed to display the current picture position values (e.g., the values most recently selected using control 116) in boxes 111 and 112, as well as to control display 16 to display a picture in a position determined by such values.

Typically, tools 117–119 are employed to select approximate picture position, and the user employs arrow button tools 121–124 in the following manner to refine these approximate selections. To shift upward (downward) the picture position, the user selects tool 121 (tool 123) by positioning cursor 31 thereon, and then presses a button on mouse 18 to make incremental upward (downward) vertical position shifts. To shift the picture position to the right (left), the user selects tool 122 (tool 124) by positioning cursor 31 thereon, and then presses a button on mouse 18 to make incremental rightward (leftward) horizontal position shifts.

In response to selection of picture size/shape control 44, followed by selection of pincushion/barrel antidistortion control 45, programmed processor 11 executes software enabling the user to control the side distortion of the pixel array displayed by display device 16. Specifically, in response to selection of control 45 in this context, a preferred embodiment of the invention displays controls 130–134 (shown in FIG. 9) in a window in display area 30.

To command programmed processor 11 to give the side edges of the displayed pixel array increasingly negative curvature (i.e., to increase the ratio of the length of horizontal lines displayed at the top or bottom of the pixel array to those displayed midway between the top and bottom), the user clicks on "slider" 131 of control 130 (using mouse 18) and moves slider toward the bottom of control 130. To command programmed processor 11 to give the side edges of the displayed pixel array increasingly positive curvature (i.e., to increase the ratio between the length of horizontal lines displayed midway between the top or bottom of the pixel array to those displayed at the top or bottom), the user clicks on slider 131 and moves it toward the top of control 130. Preferably, icon 130A (representing a pixel array with side edges of highly positive curvature) is displayed near the top of control 130, and icon 130B (representing a pixel array with side edges of highly negative curvature) is displayed near the bottom of control 130. Icons 130A and 130B serve as mnemonic aids to users, making the inventive interface "universal" and language independent. This advantage of the invention applies also to the other icons discussed herein, which have "mnemonic" appearance also.

A user can enter a side distortion value (in a range from 0 to 100, for example, where increasing value represents increasingly positive side curvature) by selecting box 134 (using mouse 18) and then typing a desired numerical value in box 134 (using keyboard 10).

Preferably, processor 11 is programmed to display the current side distortion value (e.g., the value most recently selected using tools 130 and 131) in box 134, as well as to control display 16 to display a pixel array with side curvature determined by such value.

Typically, tools 130 and 131 are employed to select an approximate side distortion value, and the user employs arrow button tools 132 and 133 in the following manner to refine such an approximate selection. To increase the side distortion value, the user selects tool 132 by positioning cursor 31 thereon, and then presses a button on mouse 18 to make incremental increases in the value (and display the incremented values in box 134). To decrease the side distortion value, the user selects tool 133 by positioning cursor 31 thereon, and then presses a button on mouse 18 to make incremental decreases in such value (and display the decremented values in box 134).

In preferred embodiments of all the displayed (virtual) controls described with reference to FIGS. 4–9, the appearance of each virtual control changes in response to user manipulation of mouse 18 or keyboard 10 to provide visual feedback to the user making adjustments to display 16. Two examples of such appearance changes are: switching of control 36 between the appearance shown in FIG. 4A and the appearance shown in FIG. 4B, and the changing position of crosshair 98 within control 96 and changing area of region 96B (as described with reference to FIG. 7). Preferably, each virtual control moves "instep" with the actions of the user (e.g., crosshair 98 translates within control 96 with instantaneous position and velocity corresponding to the instantaneous position and velocity of mouse 18 which "drags" crosshair 98).

Figure 10:
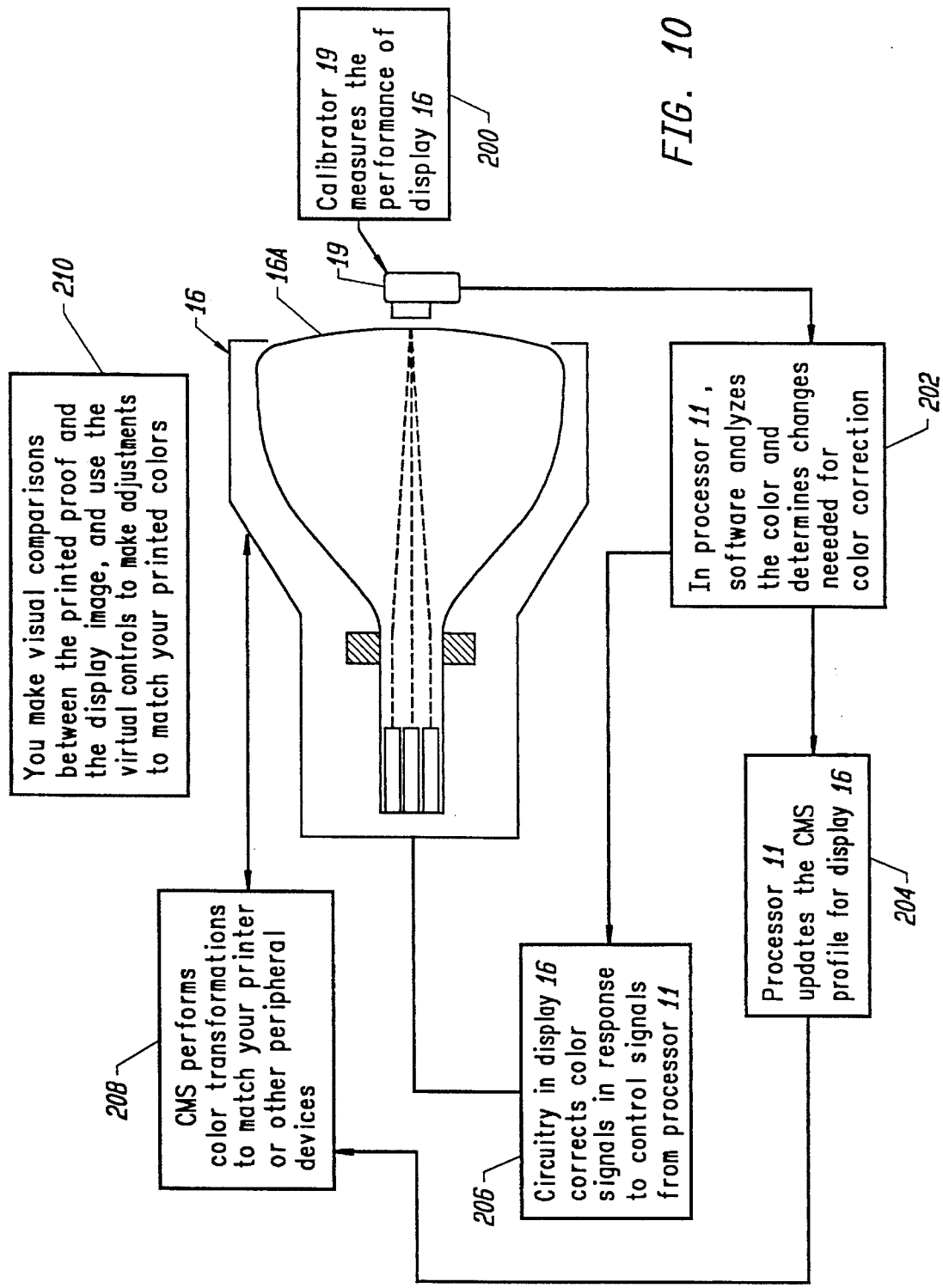
FIG. 10 is a schematic diagram of a display device and a calibration sensor, with a flow chart representing steps performed during a calibration operation in accordance with the invention.

Another aspect of the invention is the calibration operation performed in response to selection of above-described calibration icon 34. As shown in FIG. 10, first step 200 of this operation is for calibrator 19 and programmed processor 11 to measure the performance of display 16. Preferably, during step 200, processor 11 initially prompts the user to specify the white point, contrast, and brightness levels at which the calibration is to be performed. Then, processor 11 causes display device 16 to display a sequence of images on display screen 16A of device 16 (and/or controls calibrator device 19 to cause device 19 to measure a sequence of different parameters), and processor 11 receives the measured data output from device 19 in response to each image displayed on screen 16A.

During step 202, programmed processor 11 (and/or programmed processor 16C) analyzes measured data received from device 19, and generates control signals ("display parameter control" data) as needed to conform display device 16 to a set of user-specified (or default) display parameters. In preferred embodiments, processor 11 generates "profile data" from the measured data, where the profile data is indicative of a set of current display parameters, and then subtracts the profile data from "desired profile data" indicative of a set of desired (user-specified or default) display parameters to generate "adjustment dam" indicative of differences between the current and desired display parameters. An aspect of the invention is to save the adjustment data as a separate data file (in a random access memory), as described in more detail below. Optionally during step 202, processor 11 prompts the user to select a gamma correction value for inclusion in the "profile data" (preferably, it determines a recommended gamma correction value from the measured data, and displays this recommended value when prompting the user to select a gamma correction value).

In step 206, processor 11 (and/or processor 16C) sends control signals via communication link 16E to display control circuitry 16D in device 16 to cause the display control circuitry to change the "current" display parameters (described in the previous paragraph) to match the "desired" display parameters (also described in the previous paragraph).

In step 204 (which typically occurs contemporaneously with step 206), processor 11 (and/or processor 16C) stores the "profile data" and/or "adjustment data" generated in step 202 in a random access memory (e.g., memory 12 or 13 of FIG. 1) with different sets of the data stored as different, separately accessible files. The stored data is thus available to the color management system (CMS) software and display control software with which processor 11 is programmed.

Then, in step 208, the CMS software (which can be commercially available CMS software) processes the profile data to generate accurate color translations for processing image data received from (or to be sent to) a peripheral device (such as a printer or scanning device, which need not be connected to the same computer). For example, one such color translation converts RGB data into CMYK format data to be sent to a printer, to enable the printer to produce a printed image whose appearance (color characteristics) matches that of an image produced when the RGB data is displayed on display device 16.

Also, the display control software of the invention (with which processor 11 and/or processor 16C is programmed) employs the "adjustment data" stored during step 204 in the manner described herein.

During step 210, the user can "fine-tune" the display colors using the inventive virtual controls (e.g., the virtual controls described with reference to FIGS. 3–9), while visually comparing a printed image with a corresponding image displayed on screen 16A of display 16. Step 210 assumes that a test image is displayed on screen 16A, that CMS software has processed test image data to generate printer data therefrom, and that a printer has printed the printer data. Preferably, the printed image has been placed in a light box (or another proofing environment) to enable the user to view it under controlled conditions. Step 210 is then preferably performed in the following manner (to be described with reference to FIG. 11).

The user displays the test image in a window on the display screen (e.g., window 300 shown in FIG. 11) while viewing the corresponding printed image 302. To lighten or darken the displayed test image (to match printed image 302), the user employs the inventive user interface software to display the brightness/contrast controls described with reference to FIG. 5. The user then adjusts these virtual control until the brightness and contrast of the test image displayed in window 300 match those of printed image 302.

Then, the user employs the user interface software of the invention to display the white point controls described with reference to FIG. 6 (including controls 80–82, 87–89, 90, 61 and 62 shown in FIGS. 6 and 11). The user adjusts these virtual white point controls until the white (or red, green, and blue) levels of the test image displayed in window 300 match those of printed image 302. Higher white point values will give the displayed image a more strongly "blue" appearance, and lower white point values will give the displayed image a more strongly "red" appearance (and slider control 81 can be employed to add or subtract "green"). If none of the preset white points available using control 90 produces an acceptable match between the displayed and printed images, the user typically uses slider controls 80–82 until the white of the displayed image matches the white of the printed image.

Figure 3:
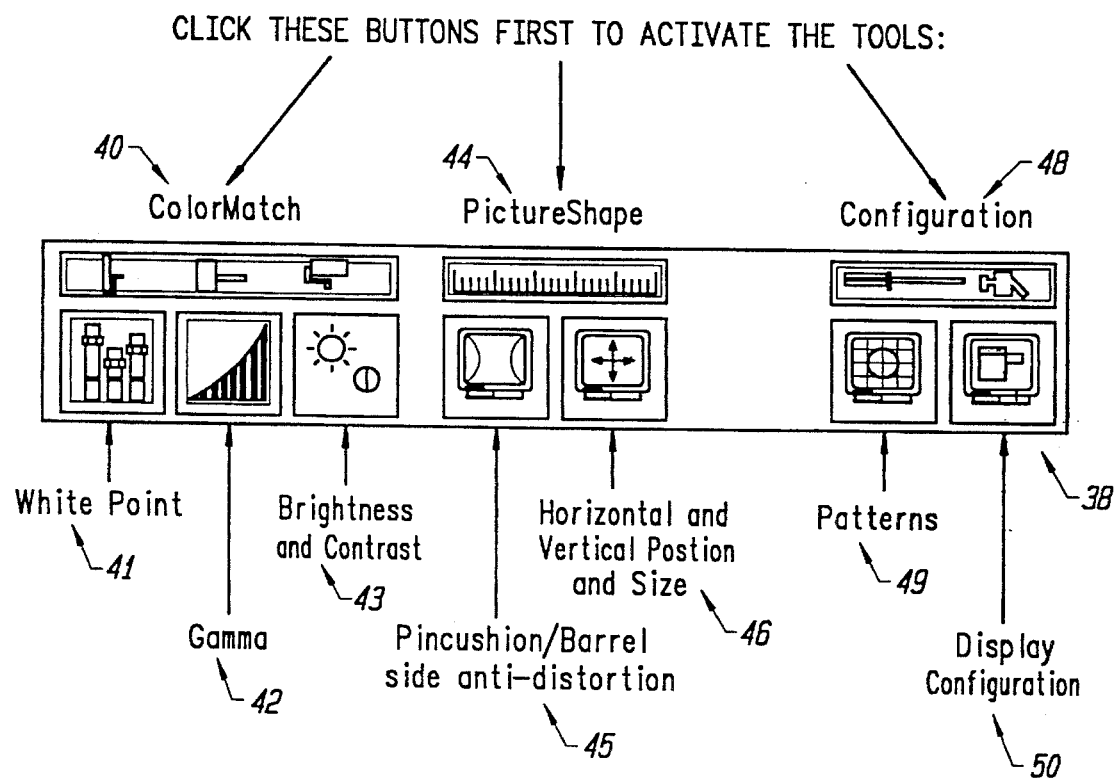
FIG. 3 is an enlarged view of a portion of the displayed tool bar of FIG. 2.

Then, to change image contrast (luminance linearity) the user employs the user interface software of the invention to select gamma control 42 (shown in FIG. 3). The user then selects different gamma values (all close to the gamma value recommended by the CMS software being used) until the gamma setting is identified which produces the best match in contrast between the displayed and printed image.

Color matching in accordance with the invention achieves better matching between displayed and printed images at proofing white points (such as a "5000 degrees Kelvin" white point) than prior art methods, for the following reason. The color matching method of the invention includes the step of directly setting the display's white point to a "proofing" level (e.g. 5000 degrees Kelvin) by directly controlling display circuitry 16D, rather than by the typical prior art method of simulating a proofing white point by compressing the digital-to-analog converters in the graphics board (digital video board 20), such as by altering color tables in the graphics board, with the display preset at a non-proofing white point (e.g., 9300 degrees Kelvin). By pre-setting the display at a non-proofing white point and then simulating a proofing white point in the described manner, the prior art undesirably eliminates (clips) as much as half the blue range that the display is otherwise capable of displaying. In contrast, the inventive method of setting white point directly using display hardware (e.g., circuitry 16D) allows the display to deliver a brighter, wider range of color at any white point setting (especially at a "proofing" white point directly set as an initial step of a color matching operation).

An important aspect of the invention is that it implements a file system for saving and restoring combinations of display settings (which can be graphics card settings or settings of hardware or software within the display device) and differences between sets of current and desired display settings, and transmitting these settings (or difference values) to others.

Conventional calibration systems (such as the above-mentioned "CALIBRATION TOOL" product available from Miro) have automatically saved color data measured during a calibration session into a data file often referred to as a "display profile". However, in contrast with the invention, there is only one "display profile" data file (which contains "current" color parameters) this type of conventional system, and this file (typically stored in EEPROM memory in a display device) is automatically overwritten with new "current" color data at the end of each calibration session (each new set of color data describes the display parameters measured during the most recent session). Some conventional display control software allows a user to edit display parameters (including geometrical settings) using software controls, but only by overwriting a configuration file (e.g., a "geometrical configuration" file) with a new set of user-selected parameter settings.

Until the present invention, display control software did not enable a user to store several types of data (in separate data files), including: display parameters measured during calibration; user-specified display control parameters ("desired" parameters); and user-specified "adjustment" data indicative of differences between old (e.g., current) and new (e.g., desired) sets of display control parameters. Storage of adjustment data (separately from display profile data and display control parameters) in accordance with the invention has several important advantages, including the following:

it enables a user to store a set of adjustment data and later retrieve the stored data for use in modifying a pre-stored "base" set of display control parameters;

it enables a user to store multiple sets of adjustment data, and then retrieve any selected one of the stored sets for rapidly modifying a "base" or default set of display control parameters (in this way, a user can effectively store a plurality of virtual displays on the desktop);

it enables sharing among multiple users (of a disk, a local area network, or a wide area telecommunications transmission system) of stored multiple sets of adjustment data, so that each user can retrieve any selected one of the stored sets for use in rapid modification of a "base" set of display control parameters; and it enables remote viewing and sharing of display configuration and/or adjustment data (since the data is organized in computer files; not in display EEPROM memory as in conventional systems).

In accordance with the invention, programmed processor 11 stores adjustment data (in files which can be retrieved and edited by the user) generated in a variety of situations including the following: adjustment data automatically generated during a calibration operation (e.g., in step 202 described with reference to FIG. 10) for conforming measured display parameters to pre-selected display parameters; and adjustment data generated for conforming pre-selected display parameters to a new set of display parameters newly selected using the inventive virtual controls (e.g., those described with reference to FIGS. 2–9).

Examples of user-specified adjustment data stored in accordance with the invention are geometry adjustment data (image horizontal and/or vertical size adjustment data, image horizontal and/or vertical position adjustment data, image pincushion/barrel side distortion adjustment data, image side distortion balance adjustment data, image trapezoidal distortion adjustment data, image trapezoidal balance adjustment data, image rotation adjustment dam, and/or image horizontal and/or vertical static convergence adjustment data), and white point adjustment data.

Examples of user-entered display control parameters stored in accordance with the invention include sets of maximum red, green, and blue CRT gun settings (maximum settings which can be used without saturating the CRT colors), gamma levels, a gamma basis for red, green, and blue graphic card look-up table (LUT) values, a locking mechanism for display controls, a locking mechanism password, a locking mechanism for gamma settings and graphic card LUT values, data identifying the type of display device hardware, and energy-saving data regarding inactivity time-outs. Examples of display parameters measured during calibration that can be stored in accordance with the invention include CIE x,y chromaticities of the additive primary colors (red, blue, and green phosphors), CIE XYZ values of white point (for standard points on the black body radiation curve, standard points such as "D50" and "D65", and/or point different than standard blackbody chromaticity), CIE XYZ values of tonal balance (gray points from white to black through the graphics card gamma LUT range), CIE XYZ values of ambient light incident on the display screen, current displayed resolution, displayed color bit-depth, display serial number, display diagnostics, and luminance data as it relates to screen position.

Various modifications and alterations in the structure and method of operation of this invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. A method for controlling a display having mechanical controls, said display being interfaced with a processor programmed with display control software for controlling the display in response to signals from an input device interfaced with the processor, said method including the steps of:
   (a) in response to a user-entered command, executing a locking operation to disable the mechanical controls; and
   (b) also in response to the user-entered command, executing the display control software to display virtual controls, where the virtual controls are selectable by manipulating the input device, and where selection of each one of the virtual controls triggers execution of a display control operation.

2. The method of claim 1, also including the step of:
   (c) also in response to the user-entered command, executing the display control software to automatically poll status of the display from time to time and automatically correct parameters of the display whose polled values differ from predetermined values.

3. The method of claim 1, wherein the display control software implements password protection by preventing selection of the virtual controls until after user entry of a password.

4. An image display system, including:
   a display having mechanical controls;
   an input device; and
   a processor interfaced with the display and the input device, wherein the processor is programmed with display control software for controlling the display in response to signals from the input device, wherein the processor is also programmed with:
   software for executing a locking operation to disable the mechanical controls in response to a first signal from the input device; and
   software for executing the display control software in response to the first signal to cause the display control software to display virtual controls, where the virtual controls are selectable by manipulating the input device, and where selection of each one of the virtual controls triggers execution of a display control operation.

5. The system of claim 4, wherein the processor is also programmed with:
   software for executing the display control software in response to the first signal to cause the display control software to automatically poll status of the display from time to time first signal, and automatically correct parameters of the display whose polled values differ from predetermined values, and automatically lock the mechanical controls if they are found to be unlocked.

6. The system of claim 5, wherein the processor is also programmed with:
   software for executing the display control software in response to the first signal to cause the display control software to implement password protection by preventing selection of the virtual controls until after user entry of a password.

* * * * *